United States Patent [19]
Wright et al.

[11] Patent Number: 6,078,959
[45] Date of Patent: Jun. 20, 2000

[54] SUBSCRIBER-ORIGINATED CALL DEFERRED QUEUING

[75] Inventors: Andrew S. Wright, Vancouver, Canada; Carl Mansfield, Colorado Springs, Colo.; Izzet Murat Bilgic, Colorado Springs, Colo.; Benjamin Kendrick Gibbs, Colorado Springs, Colo.

[73] Assignee: Opuswave Networks, Inc., Colorado Springs, Colo.

[21] Appl. No.: 09/015,379

[22] Filed: Jan. 29, 1998

[51] Int. Cl.[7] .................................................. G06F 15/16
[52] U.S. Cl. ...................... 709/227; 709/219; 709/226; 709/229; 370/230; 370/280; 370/282
[58] Field of Search .................. 395/200.57, 200.33, 395/200.49, 200.56, 200.59; 709/227, 200, 219, 226, 229; 370/230, 280, 282, 294, 295, 337, 347

[56] References Cited

U.S. PATENT DOCUMENTS

| | | | |
|---|---|---|---|
| 5,081,622 | 1/1992 | Nassehi et al. | 370/85.2 |
| 5,339,313 | 8/1994 | Ben-Michael et al. | 370/85.13 |
| 5,404,353 | 4/1995 | Ben-Michael et al. | 370/79 |
| 5,408,468 | 4/1995 | Petersen | 370/377 |
| 5,457,735 | 10/1995 | Erickson | 455/450 |
| 5,493,651 | 2/1996 | Crouse et al. | 395/200.14 |
| 5,555,266 | 9/1996 | Bucchholz et al. | 370/95.1 |
| 5,574,977 | 11/1996 | Joseph et al. | 455/450 |
| 5,596,572 | 1/1997 | Will-Fire et al. | 370/360 |
| 5,717,745 | 2/1998 | Vijay et al. | 379/112 |
| 5,721,762 | 2/1998 | Sood | 379/59 |

*Primary Examiner*—Zarni Maung
*Assistant Examiner*—Saleh Najjar

[57] ABSTRACT

Methods and apparatus for queuing subscriber-originated connection requests for respective calls at a server system. A server system in a telecommunications network receives subscriber-originated connection requests for subscriber pending call access to the server system, and thus, the network. Subscriber-originated connection requests are queued at the receiving server system. The server system receiving the subscriber-originated connection request transmits a first message to the respective subscriber originating the connection request upon the server system's queuing of the connection request. Subsequently, upon the server system allocating a connection resource to a queued subscriber-originated connection request, the server system transmits a second message to the respective subscriber.

20 Claims, 10 Drawing Sheets

SUBSCRIBER-ORIGINATED CALL DEFERRED QUEUING

FIELD OF THE INVENTION

The field of this invention pertains to telecommunications, including a telecommunications network server that provides equity of access between network and subscriber-originated connection requests for respective pending calls.

DESCRIPTION OF THE TECHNOLOGY

Circuit-switched, i.e., switch/router or server, system providers provide connection resources, i.e., servers, for connection requests to a telecommunications network. A service supported by a telecommunications network, e.g., telephony or packet data, generally uses both network-originated and subscriber-originated connection requests for access to the server system. In addition, a scheme of random access signalling is used to aid subscriber devices in obtaining an available resource for a connection request on the server system.

Network-originated connection requests are generally queued at the respective receiving server system if the server system does not have an adequate number of connection resources to allocate to them at the time of their receipt. The network-originated connection requests remain queued at the server system until they are either serviced, i.e., allocated one or more connection resources, or until they are deleted from the respective queue because their associated lifetime, i.e., the time they are to be maintained waiting for allocation of one or more connection resources, expires. If a connection resource is deleted, the respective call is deemed dropped.

In contrast, in the prior art, subscriber-originated connection requests are not queued at a respective server system. Upon receiving a subscriber-originated connection request that it cannot allocate the necessary connection resources to, a server system either transmits a message indicating that the connection request cannot be serviced, or simply ignores the connection request. In either case, the subscriber originating the connection request may begin an appropriate back off procedure before again attempting access to a server system for its respective pending call. This, in turn, provides an advantage to network-originated connection requests, as they may simply be queued at the respective server system, awaiting a connection resource allocation.

When a connection resource does become available at a respective server system, it will generally be allocated to a queued network-originated connection request. As subscriber-originated connection requests that cannot be serviced upon receipt are not queued at the respective server system, they must necessarily be re-transmitted to the server system. The server system, for its part, generally services the queued network-originated connection requests already at the server system over subscriber-originated connection requests that are necessarily retransmitted to the server system, and, thus, are not generally at the server system when connection resources become available. The resultant preferential advantage to network-originated connection requests is undesirable if a goal of the network is to provide equity of access to both network and subscriber-originated traffic.

Execution of a back off procedure and subsequent re-attempts to access connection resources for a pending call also results in additional subscriber-originated connection requests being transmitted to a server system. Moreover, additional random access signalling must be executed, to aid subscribers in obtaining available connection resources on the server system. The subsequent higher rate of random access signalling which generally results leads to additional traffic congestion on the server system. Additionally it can create an undesirable increase in co-channel interference at a server system, which in turn can lead to a reduction in server system capacity for traffic handling because of a corresponding increase in server interchange activity.

Thus, it would be advantageous to provide a network system that afforded equity of access between network and subscriber-originated traffic. Additionally, it would be advantageous to provide a network system that required minimum random access signalling and minimum subscriber-originated connection request transmissions for respective calls, especially those generated in the prior art during heavy traffic loading conditions.

SUMMARY OF THE INVENTIONS

The present inventions provide a network server system that offers equity of access between network and subscriber-originated connection requests for respective pending calls. The inventions comprise methods and apparatus for queuing subscriber-originated connection requests at a server system, in order that they may be allocated applicable connection resources when the respective resources subsequently become available.

In a presently preferred embodiment, a network server system queues a subscriber-originated connection request if it correctly receives one at a time when the server system has an inadequate number of connection resources to allocate to it. The server system transmits a message to the respective subscriber originating the connection request upon the queuing of the subscriber's connection request. Subsequently, if and when the server system does allocate a connection resource to the queued subscriber-originated connection request, it transmits a second message to the respective subscriber, generally indicating the allocation of connection resources for the respective connection request.

Thus, a general object of the present inventions is to support equity of access between network and subscriber-originated connection requests at a respective network server system. Other and further objects, features, aspects and advantages of the present inventions will become better understood with the following detailed description of the accompanying drawings.

DESCRIPTION OF THE PREFERRED EMBODIMENTS

A presently preferred network embodying dual service server systems in accordance with the present inventions is described in copending U.S. patent applications Ser. No. 08/886,853, entitled "Resource Controllers For Use in a Non-Unitary Service System", and, entitled "Methods for Resource Control in a Non-Unitary Service System", both hereby incorporated by reference as if fully set forth herein.

Figure 1:
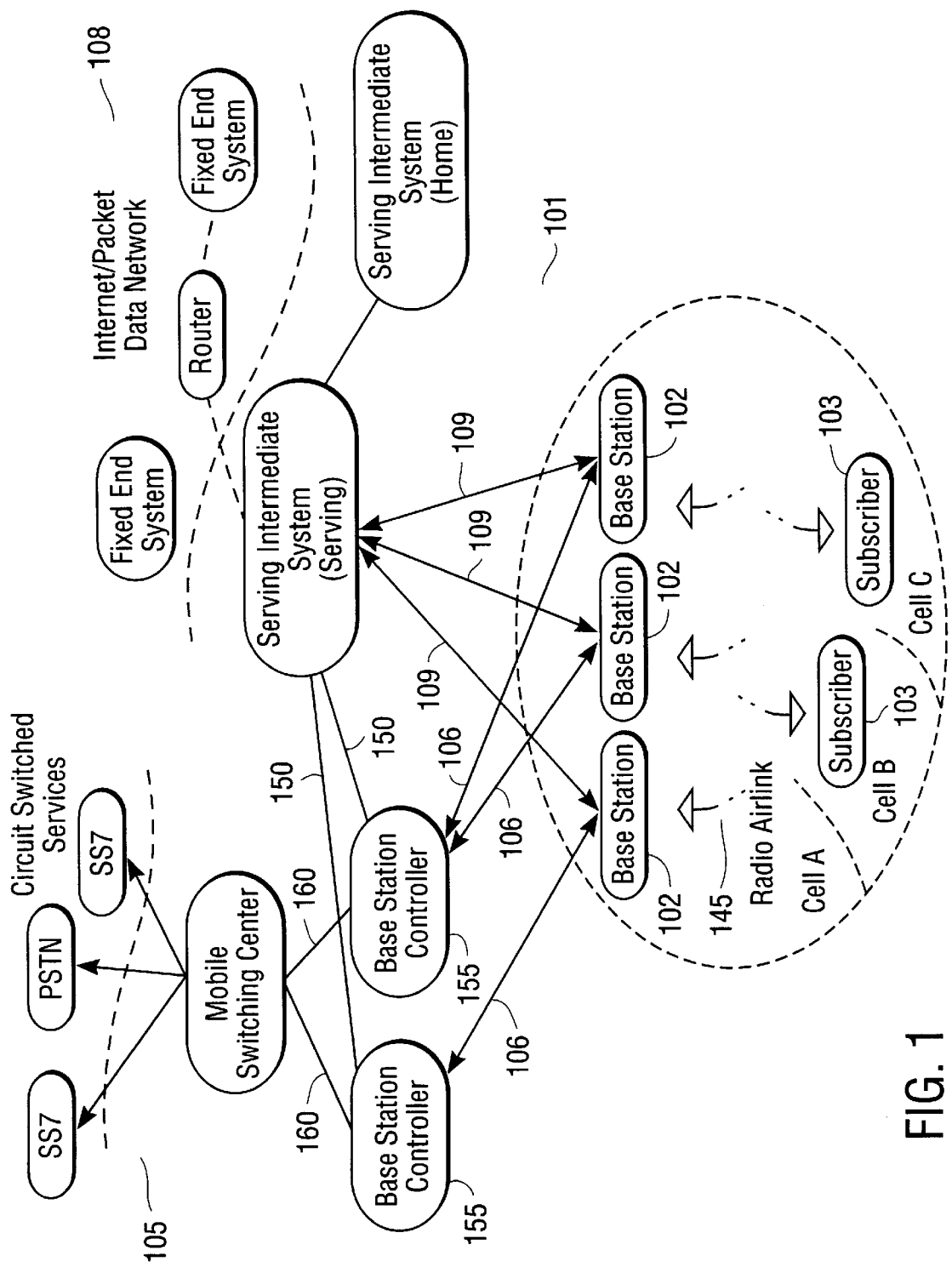
FIG. 1 is a block diagram of a presently preferred network embodying dual service server systems.

In particular, in a presently preferred network 101 of FIG. 1, both a primary and a secondary service are supported. In a presently preferred embodiment, the primary service is a circuit switched service, which may include voice, i.e., telephony, messages. The primary service is generally characterized by relatively low connection request arrival rates and relatively long connection in progress, i.e., call service, times. When a primary service connection request is allocated a respective connection resource for communication on the network, it becomes a connection in progress.

In a presently preferred embodiment, the secondary service is a packet data service, which may consist of data messages. The secondary service is generally characterized by relatively high connection request arrival rates and relatively short connection in progress service times. As with a primary service connection request, when a secondary service connection request is allocated a respective connection resource, it becomes a connection in progress.

In a presently preferred embodiment, network 101 is a wireless network. Alternative network embodiments include wireline or wireless/wireline, including local area networks ("LAN"s) and wide area networks ("WAN"s). Additionally, there is no requirement that the network support two services, or only two services. For example, a single-service server system could be used in a network supporting, e.g., voice or data. As another example, a tri-service server system could be used in a network supporting, e.g., voice, data, and video on demand.

Network 101 is comprised of a plurality of server systems 102. In a presently preferred embodiment, each server system 102 is a base station. Each base station 102 may communicate with a plurality of network subscribers 103 via over-the-air communication links 145, e.g., radio airwaves. Each base station 102 has a primary service interface (not shown) which connects the base station 102 to a base station controller 155, via a communication link 106. Each base station controller 155 is linked, via a communication link 160, to a circuit switched network 105. The circuit switched network 105 may be, but is not limited to, a GSM network or a POTS network. The communication links 106 may include, but are not limited to, e.g., a coaxial cable, a fiber optic cable, a digital radio link, or a telephone line. The communication links 160 may include, but are not limited to, e.g., a coaxial cable, a fiber optic cable, a digital radio link, or a telephone line.

Each base station 102 also has a secondary service interface (also not shown) which connects the base station 102 to a packet data network 108, via a communication link 109. Alternatively, each base station 102 may communicate with a base station controller 155 via a communication link 106. The respective base station controller 155, in turn, communicates with the packet data network 108 via a communication link 150. The communication links 109 may include, but are not limited to, e.g., a coaxial cable, a fiber optic cable, a digital radio link, or a telephone line. The communication links 150 may include, but are not limited to, e.g., a coaxial cable, a fiber optic cable, a digital radio link, or a telephone line.

Each base station 102 may receive primary service connection requests from both subscribers 103 and from the circuit switched network 105. Each base station 102 may also receive secondary service connection requests from both subscribers 103 and from the packet data network 108.

Figure 2:
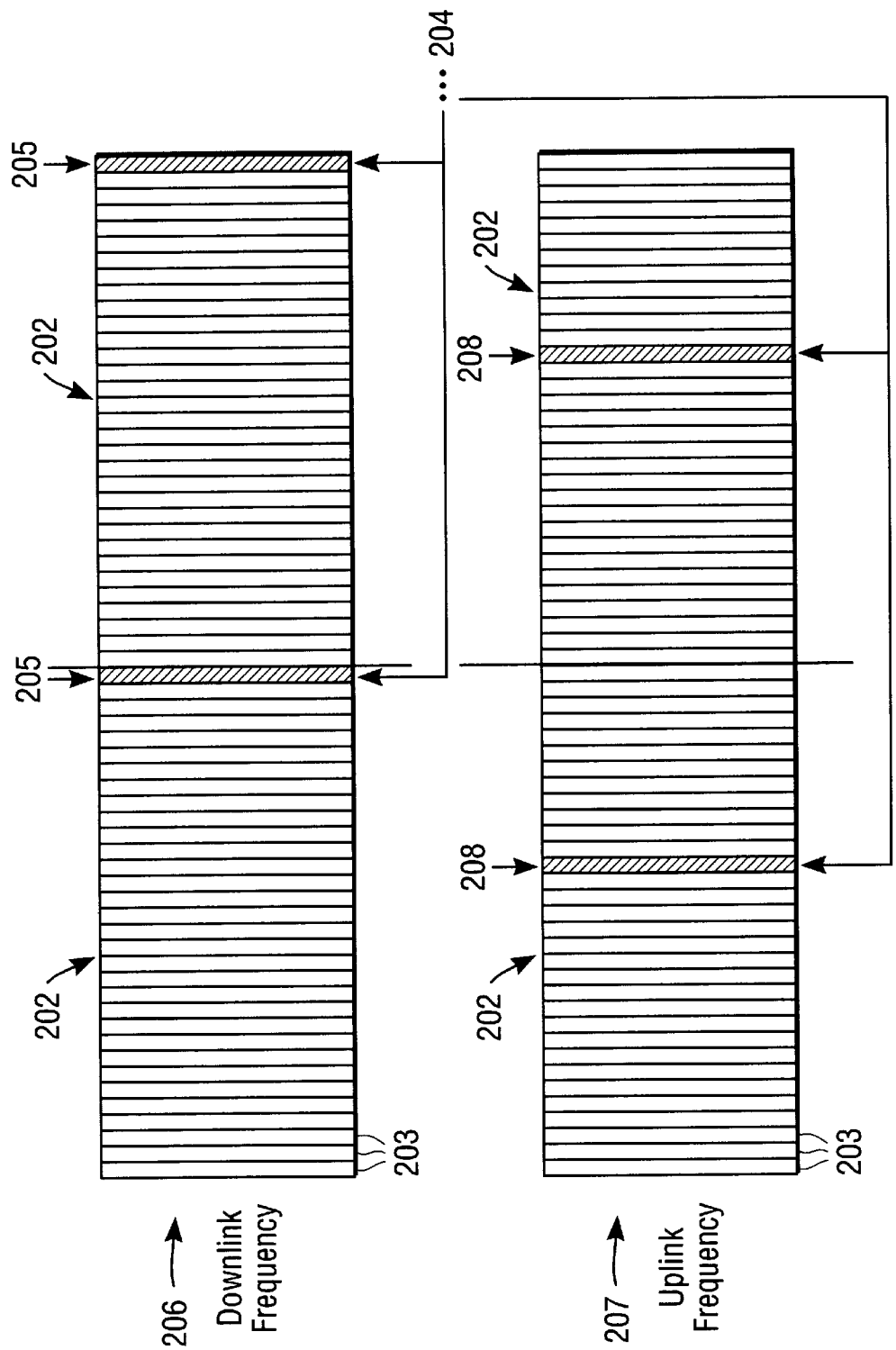
FIG. 2 is a presently preferred embodiment of a TDMA time frame/time slot structure.

In a presently preferred embodiment, each base station 102 of FIG. 1 employs a time division multiple access/frequency division duplex, i.e., TDMA/FDD, frame/slot structure for transmission and reception of communications to and from subscribers 103. In a presently preferred embodiment, each time frame 202 of FIG. 2 is equally divided between thirty-two full duplex time slots 203. Thus, in a presently preferred embodiment, there are thirty-two time slots 203, or connection resources, which collectively comprise a respective base station's over-the-air ("OTA") resource.

A channel 204 is a collection, over a generally extended period of time, of the same time slot 203 (or time slots) in consecutive time frames 202. Generally, when a connection request is allocated a connection resource, it is allocated a channel 204, i.e., one or more time slots 203 over a plurality of time frames 202.

In a presently preferred embodiment, a base station 102 is allocated a first frequency for its transmit function. This first frequency is generally deemed a downlink frequency. The base station 102 transmits to subscribers 103 of the respective network system 101 at the downlink frequency 206. In a presently preferred embodiment, the downlink frequency 206 is within the PCS bands.

In a presently preferred embodiment, the subscribers 103 of the respective network system 101 are allocated a second frequency, different from the downlink frequency, for their transmit function. This second frequency is generally deemed an uplink frequency. The subscribers 103 of the network system 101 transmit to a base station 102 at the uplink frequency 207. In a presently preferred embodiment, the uplink frequency 207 is within the PCS bands.

For example, if a subscriber 103 requests a connection resource on a base station 102, it may be allocated channel 204 of FIG. 2, which consists of the thirty-second time slot 205 at the downlink frequency 206 and the twentieth time slot 208 at the uplink frequency 207 for a plurality of time frames 202. Upon allocation of channel 204, the respective subscriber 103 transmits to the base station 102 at the uplink frequency 207 in each time slot 208 of each time frame 202 for the duration of the connection in progress. Upon allocation of channel 204, the base station 102 transmits to the respective subscriber 103 at the downlink frequency 206 in each time slot 205 of each time frame 202 for the duration of the connection in progress. As depicted in FIG. 2, in a presently preferred embodiment, time slot(s) allocated to be used at the uplink frequency (e.g., time slot 208 at uplink frequency 207) generally differ from time slot(s) allocated to be used at the downlink frequency (e.g., time slot 205 at downlink frequency 206) of a respective channel (e.g., channel 204).

Figure 3:
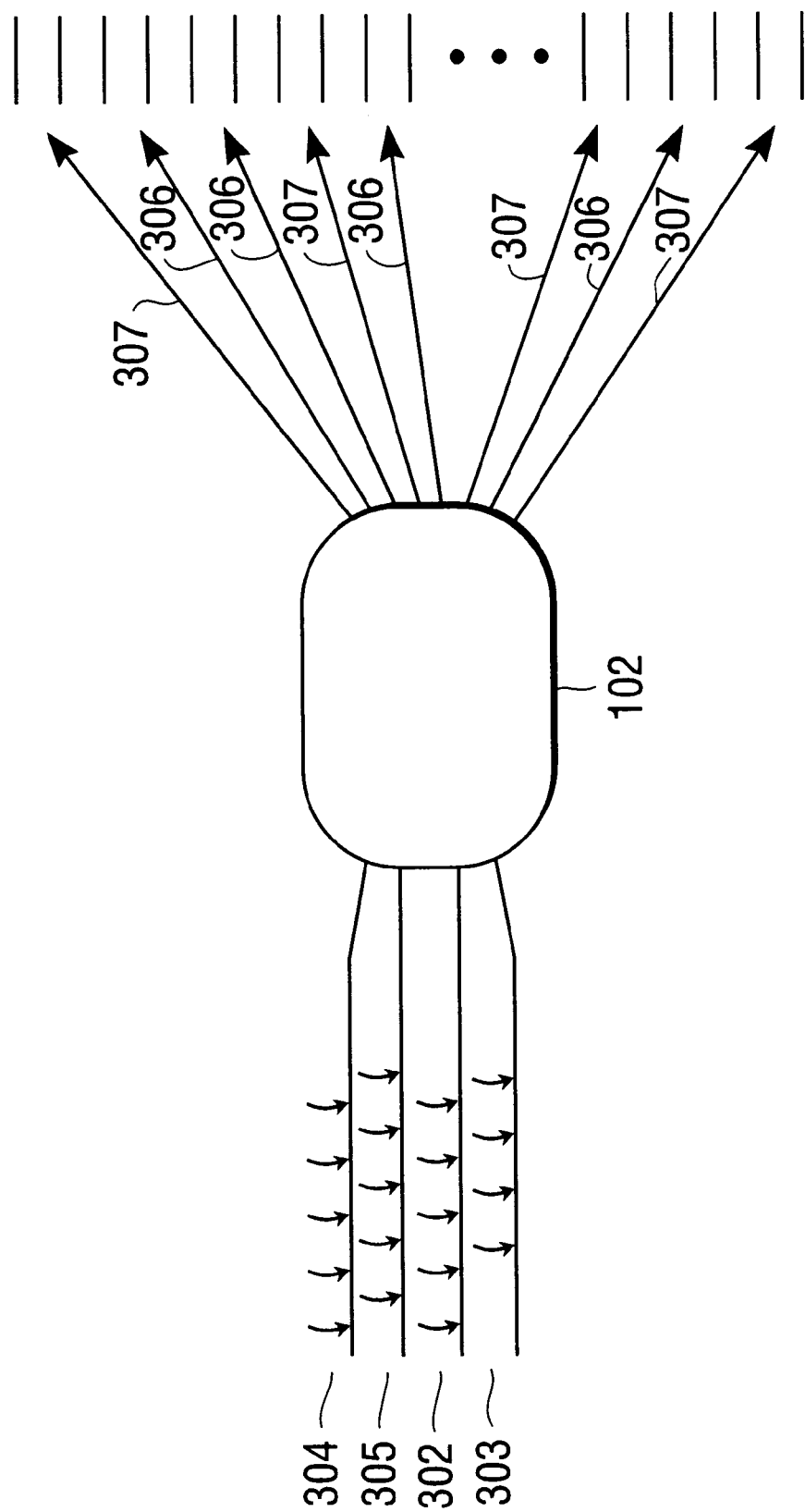
FIG. 3 is a block diagram of a dual service server system.

Referring to FIG. 3, a respective server system, e.g., base station 102, receives a plurality of subscriber-originated primary service connection requests 302, a plurality of network-originated primary service connection requests 303, a plurality of subscriber-originated secondary service connection requests 304 and a plurality of network-originated secondary service connection requests 305. If the base station 102 allocates one or more time slots. i.e., servers, or connection resources, to any primary service connection request 302 or 303, the connection request becomes a primary service connection in progress 306. Likewise, if the base station 102 allocates one or more time slots to any secondary service connection request 304 or 305, the connection request becomes a secondary service connection in progress 307.

The arrival rates of the primary service connection requests 302 and 303 and the service times of the primary service connections in progress 306 at a respective base station 102 are generally, but not necessarily, identical, irrespective of the originating source, i.e., network-originated or subscriber-originated. The arrival rates of the secondary service connection requests 304 and 305 and the service times for the secondary service connections in progress 307 at a respective base station 102 may also be, but are not necessarily, identical, irrespective of the originating source. However, the connection request arrival rates and the connection in progress service times associated with each service, primary and secondary, generally differ. In particular, the primary service is characterized by generally lower connection request arrival rates and longer connection in progress service times than the secondary service.

Figure 4:
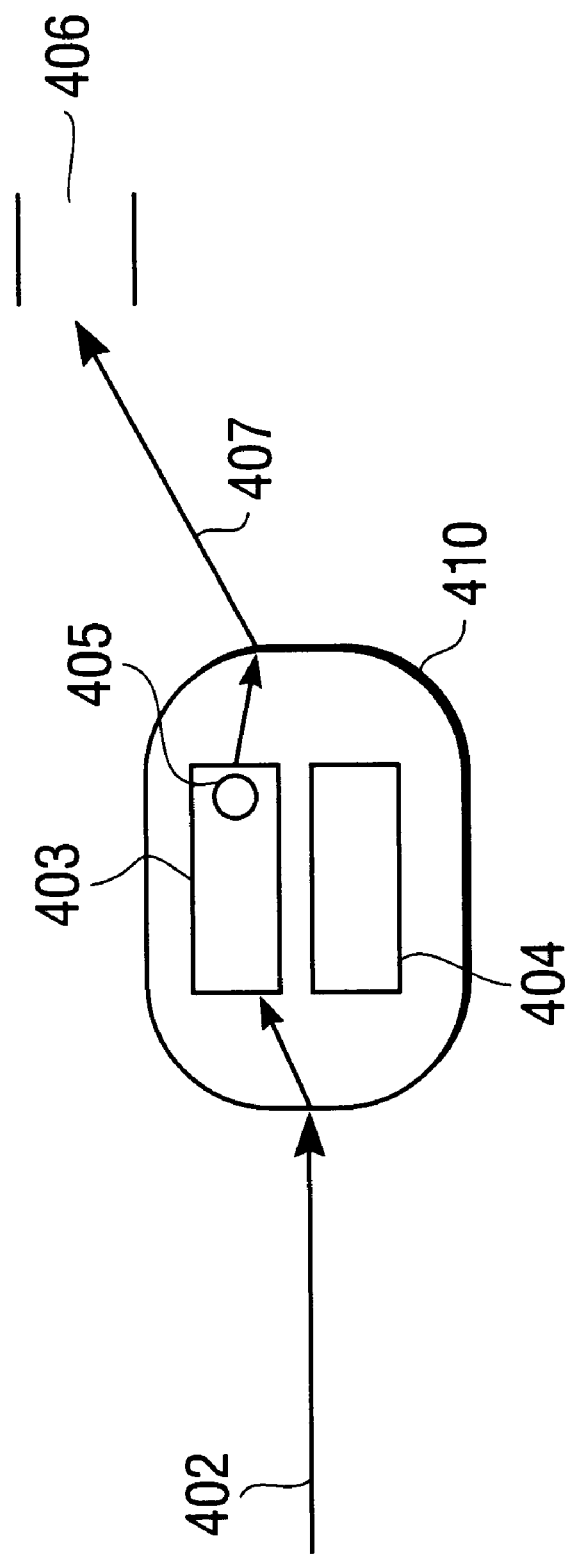
FIG. 4 illustrates the handling of an exemplary network-originated connection request at a server system.

Referring to FIG. 4, a typical network-originated connection request 402 arrives at a respective server system 410. Network-originated connection request 402 is a request from an associated network for a connection link, i.e., time slot allocation, on the server system 410, for use in subsequent communications with a subscriber. Upon receiving the network-originated connection request 402, the server system 410 checks if it has available connection resources to service it. If not, the server system 410 queues the connection request 402 to either a network primary service queue 403 or a network secondary service queue 404, determined by whether the network-originated connection request 402 is for a circuit switched or a packet data service respectively.

If there are available connection resources to allocate to the network-originated connection request 402, the server system 402 checks to see if there are any queued, i.e., pending, connection requests. If not, the server system 410 allocates the appropriate number of time slots 406 to the connection request 402, which is then designated a connection in progress 407. If, however, there are pending connection requests in the network primary service queue 403 and/or the network secondary service queue, the server system 410 queues the connection request 402 to the network primary service queue 403, where is designated a pending connection request 405.

The server system 410 interrogates queues 403 and 404 periodically to determine if either have any pending connection requests. For exemplary purposes, assume connection request 402 is for a circuit switched service, and has been queued in the server system's network primary service queue 403; thus, it is a pending connection request 405. The server system 410, if it has an appropriate number of available time slots 406 to allocate to the pending connection request 405 when it interrogates service queue 403, removes the pending connection request 405 from the service queue 403 and allocates the necessary time slot(s) to it. At this time, the connection request 402 is designated a connection in progress 407.

In a presently preferred embodiment, one or more time slots, i.e., connection resources, may also be negotiated for and allocated, or assigned, to an individual subscriber with a connection request for a server system, i.e., base station. The negotiation for time slots on a base station by a subscriber can take place at any time through a random access signalling sequence.

In a random access signalling sequence a base station transmits a message in a time slot at the downlink frequency indicating that a subscriber can transmit the base station a message for a connection request in a time slot at the uplink frequency. More particularly, the base station transmits a poll message in a time slot at the downlink frequency to indicate that a subscriber may transmit a resource request message in a time slot at the uplink frequency, for a connection request to the base station. In a presently preferred embodiment, the poll message indicates one or more time slots in which a subscriber may transmit a resource request message to the respective base station. In an alternative embodiment, a subscriber transmits a respective resource request message in the same time slot of the subsequent time frame in which the base station transmits a poll message.

In a presently preferred embodiment, a base station typically transmits two poll messages per time frame, i.e., utilizes two time slots per time frame for poll message transmission, under generally low to moderate traffic conditions. As a base station experiences heavy traffic conditions it can resort to transmitting only one or no poll messages per time frame, until traffic conditions return to moderate or low levels.

When a call becomes pending at a subscriber, the subscriber listens at the downlink frequency for a poll message. Upon receipt of a poll message, the subscriber examines it and then transmits a proper resource request message in an appropriate time slot at the uplink frequency to the respective base station, requesting connection resources to the base station. In a normal, successful random access signalling sequence, the base station, upon receipt of the resource request message from the subscriber, responds by transmitting a resource acknowledge message to the subscriber, identifying the time slot(s) that are to be used by the subscriber for transmitting and/or receiving its subsequent circuit switched or packet data messages to/from the base station.

In a presently preferred embodiment, a base station allocates one or more available time slots to random access signalling, i.e., poll/resource request message transmission/reception, before it allocates time slots for either any primary service connection request, network or subscriber-originated, or any secondary service connection request, network or subscriber-originated. Similarly, in a presently preferred embodiment, a base station allocates time slots for primary service connection requests, network or subscriber-originated, before it services any secondary service, network or subscriber-originated, connection request.

Figure 5:
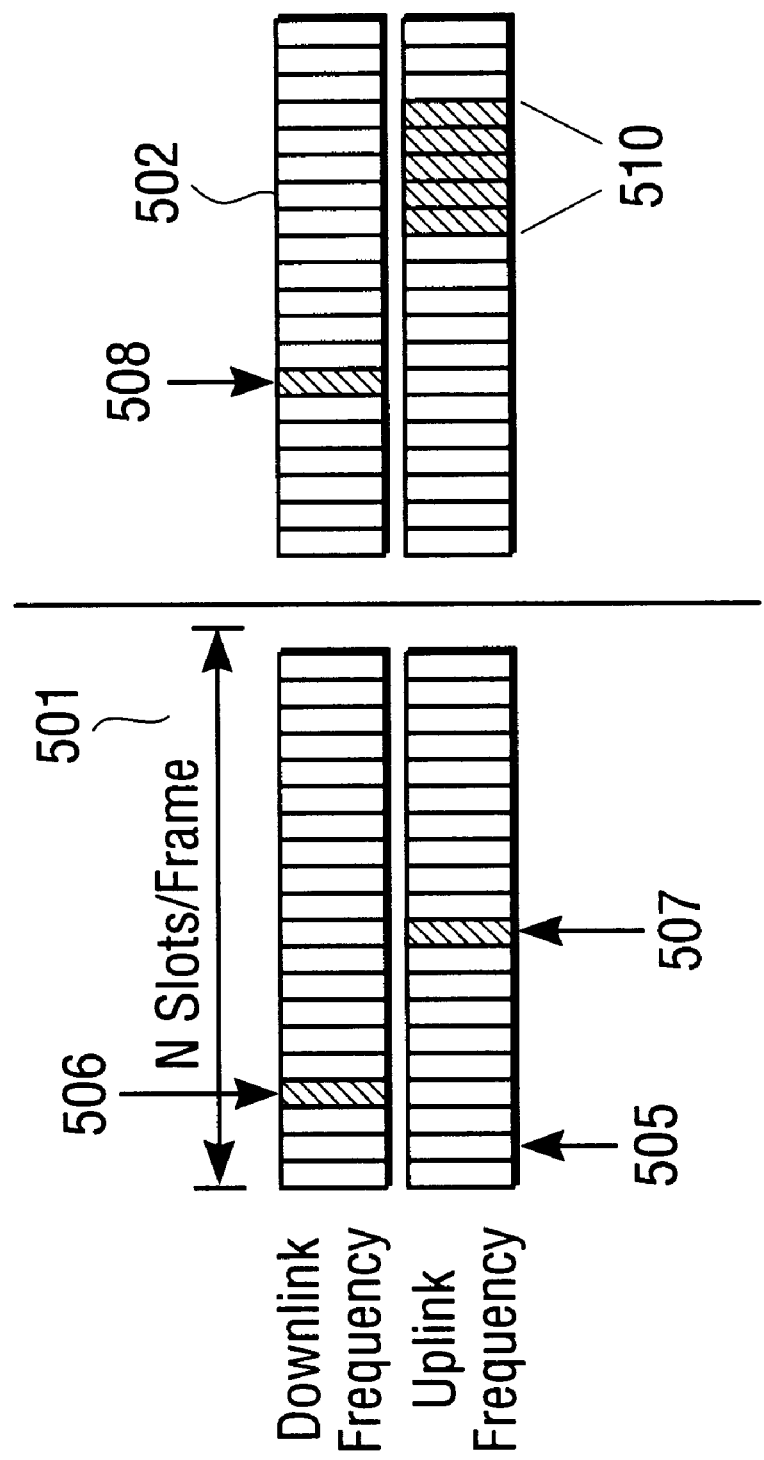
FIG. 5 is an illustrative random access signalling sequence between a subscriber and a base station.

Referring to FIG. 5, a random access signalling sequence between a subscriber and a server system, e.g., base station, is illustrated. In time slot 505 of time frame 501, a call becomes pending at a subscriber. In time slot 506 of time frame 501, the subscriber receives a poll message from the base station indicating that a resource request message may be sent by the subscriber in time slot 507. The subscriber transmits an appropriate resource request message in time slot 507 of time frame 501 and the base station responds with a resource acknowledge message for the subscriber in time slot 508 of time frame 502. The resource acknowledge message in this exemplary scenario indicates that the subscriber is to use time slots 510 of the present and subsequent time frames, i.e., channel 510, for its service traffic, i.e., circuit switched or packet data, transmissions.

Should more than one subscriber respond to the same poll message from a base station with respective resource request message transmissions, a collision occurs. In this case, the base station generally does not respond to any subscriber involved in the collision. The subsequent lack of response from the base station, i.e., no resource acknowledge message transmitted to any subscriber involved in the collision, causes the involved subscribers to back off for a calculated time interval, before again attempting to acquire a connection link, i.e., one or more time slots, on a base station.

In a presently preferred embodiment, each subscriber that feels it has been involved in a collision delays a random number of milliseconds before resuming the search for a time slot in which a poll message is transmitted from a base station. Determination of a collision delay time for a subscriber takes into consideration the number of previous resource request message transmission attempts the respective subscriber has made for the pending call. In a presently preferred embodiment, if any subscriber's number of resource request message transmission attempts for a respective pending call exceeds a specific, configurable, number of attempts, the subscriber considers the respective pending call blocked, and drops it.

Figure 6:
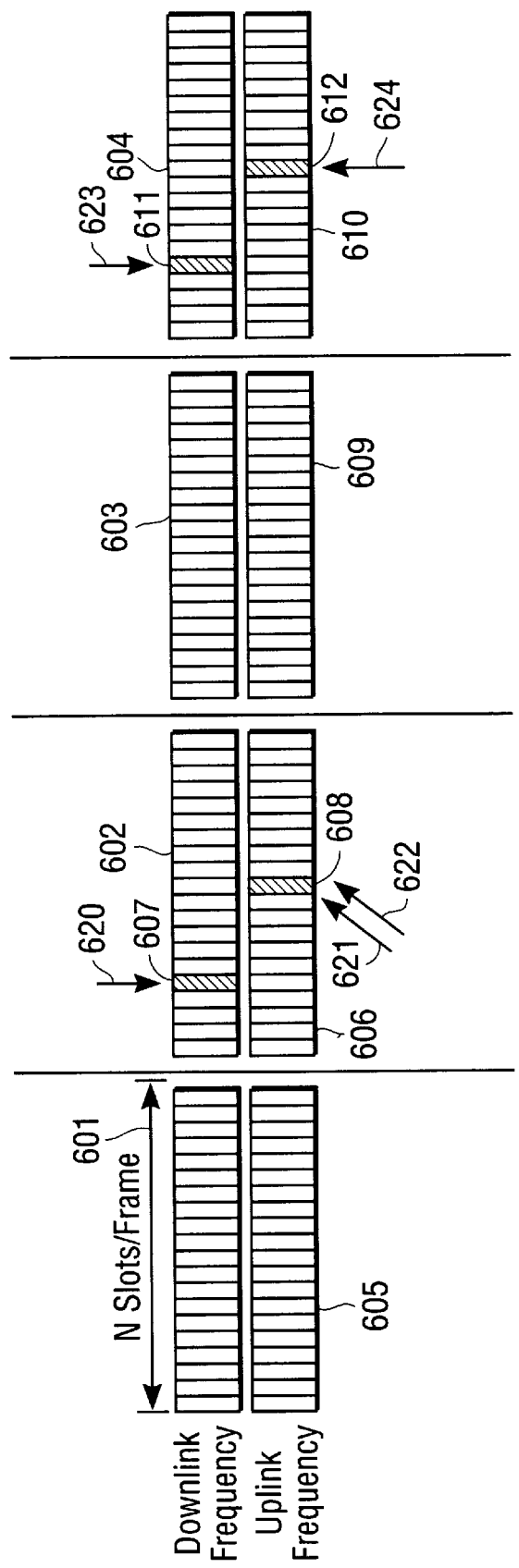
FIG. 6 is an exemplary subscriber collision scenario.

In an exemplary subscriber collision scenario, as depicted in FIG. 6, a first subscriber has a call become pending at time slot 605 of time frame 601. A second subscriber has a call become pending at time slot 606 of time frame 602. At time slot 607 of time frame 602 a base station transmits a poll message 620, indicating a subscriber may transmit a resource request message in time slot 608. Both the first and second subscribers receive the poll message 620, and, thus, transmit respective resource request messages 621 and 622 in time slot 608 of time frame 602, resulting in a collision. The first subscriber backs off until time slot 609 of time frame 603, while the second subscriber backs off until time slot 610 of time frame 604.

The base station transmits a second poll message 623 in time slot 611 of time frame 604, indicating a subscriber may transmit a resource request message in time slot 612. The first subscriber receives the poll message 623 because it has been listening for one since time slot 609 of the previous time frame 603. The second subscriber, however, does not receive the poll message 623 because it does not begin to listen for any poll message until time slot 610 of time frame 604.

The first subscriber, having received the poll message 623, transmits a resource request message 624 for its respective pending call in time slot 612 of time frame 604. Because there is no other subscriber transmitting a resource request message in this time frame/time slot, no collision occurs on the first subscriber's second attempt at a resource request message transmission to the base station.

Subscriber-originated traffic, circuit switched or packet data, cannot be transmitted until the respective subscriber successfully transmits a resource request message in response to a poll message transmission from a base station. Consequently, a portion of a base station's time slots must be allocated for the transmission of poll messages if subscriber-originated traffic is to be supported.

If a subscriber does not receive a poll message from a base station, it cannot begin a random access signalling sequence to acquire a connection link on a base station. In this case, in a presently preferred embodiment, after a specified amount of time, the subscriber deems its respective pending call blocked, and drops its.

Also, as previously indicated, if a subscriber does not receive a response to its resource request message transmission to a base station, it assumes a collision has occurred. In this case, the subscriber backs off for a calculated time interval, and then begins anew the random access signalling sequence. If the subscriber is unsuccessful in receiving a base station response after a predefined number of random access signalling sequence attempts, it deems its respective pending call blocked, and drops it.

In the prior art, if a server system successfully receives a resource request message from a subscriber, but determines it does not have adequate time slots to allocate to the subscriber's respective connection request, it either ignores the received resource request message from the subscriber, or, alternatively, issues an access denial message to the subscriber. In the first instance, the subscriber, on failing to receive a response to its resource request message, assumes a collision has occurred, and backs off for a calculated time interval before beginning a random access signalling sequence anew. In the second instance, the subscriber may respond as if in a collision scenario, i.e., back off for a calculated time interval before beginning a random access signalling sequence anew. Alternatively, in the second instance, the subscriber may simply continue to look for a poll message transmission that it can respond to with a respective resource request message transmission.

Figure 7A:
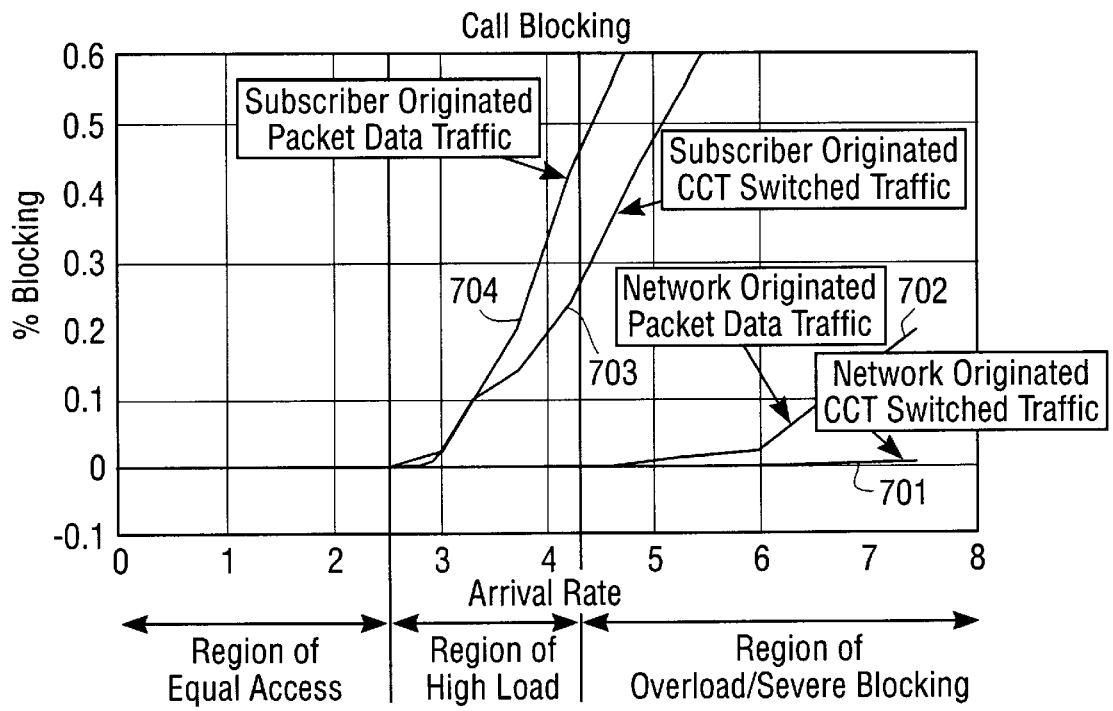
FIGS. 7A and 7B are prior art call blocking graphs.
Figure 7B:
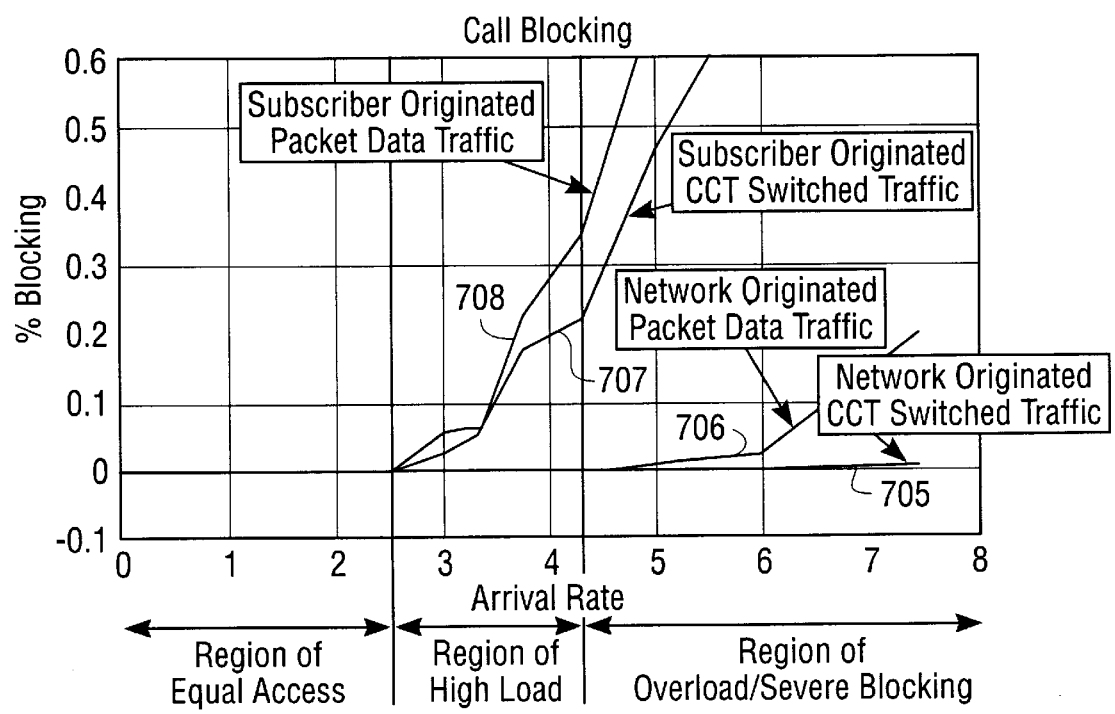

The prior art call blocking results of FIGS. 7A and 7B reveal that in the prior art subscriber-originated traffic, irrespective of service, i.e., circuit switched or packet data, is subject to call blocking at significantly lower connection request arrival rates than network-originated traffic. Specifically, FIG. 7A illustrates the percentage of call blocking experienced in the prior art by network-originated primary service connection requests 701, network-originated secondary service connection requests 702, subscriber-originated primary service connection requests 703 and subscriber-originated secondary service connection requests 704 when a slot consolidation resource allocation policy is employed. Using a slot consolidation resource allocation policy, a server system attempts to optimally pack a connection request into the smallest possible span of available time slots.

FIG. 7B illustrates the percentage of call blocking experienced in the prior art by network-originated primary service connection requests 705, network-originated secondary service connection requests 706, subscriber-originated primary service connection requests 707 and subscriber-originated secondary service connection requests 708 when a random slot assignment resource allocation policy is employed. Using a random slot assignment resource allocation policy, a server system performs a time slot assignment for a connection request by allocating to the connection request random time slot(s) from the set of legitimate, available time slots.

FIGS. 7A and 7B illustrate that in the prior art, irrespective of the particular allocation policy employed by a server system, subscriber-originated traffic experiences significantly greater call blocking than respective network-originated traffic. This is generally due to network-originated connection requests being queued at a server system if they cannot be serviced upon their receipt, and subscriber-originated connection requests not likewise queued.

During periods of heavy traffic loading at a server system, less connection resources are available to service network or subscriber-originated connection requests. Consequently, a small population of subscribers with pending calls grows while the respective subscribers wait to participate in a successful poll/resource request random access signalling sequence.

Consequently, there is a high probability that multiple subscribers will become involved in a collision. This is because the subscribers with pending calls that have been waiting to attempt access to a server system will respond to the same poll message when it is transmitted. The ensuing multiple subscriber collision causes the population of involved subscribers to all back off.

In the prior art, the time in which all the involved subscribers are backing off provides a short period of time in which network-originated connection requests are naturally advantaged. This is due to network-originated connection requests being queued at a server system if they cannot be serviced upon receipt. In contrast, subscriber-originated connection requests that cannot be serviced upon receipt are not queued, and, thus, are generally less likely to be at the server system when an appropriate number of connection resources subsequently become available. As a result of the network-originated connection request advantage, subscriber-originated connection requests generally experience a significantly higher call blocking rate.

Figure 8:
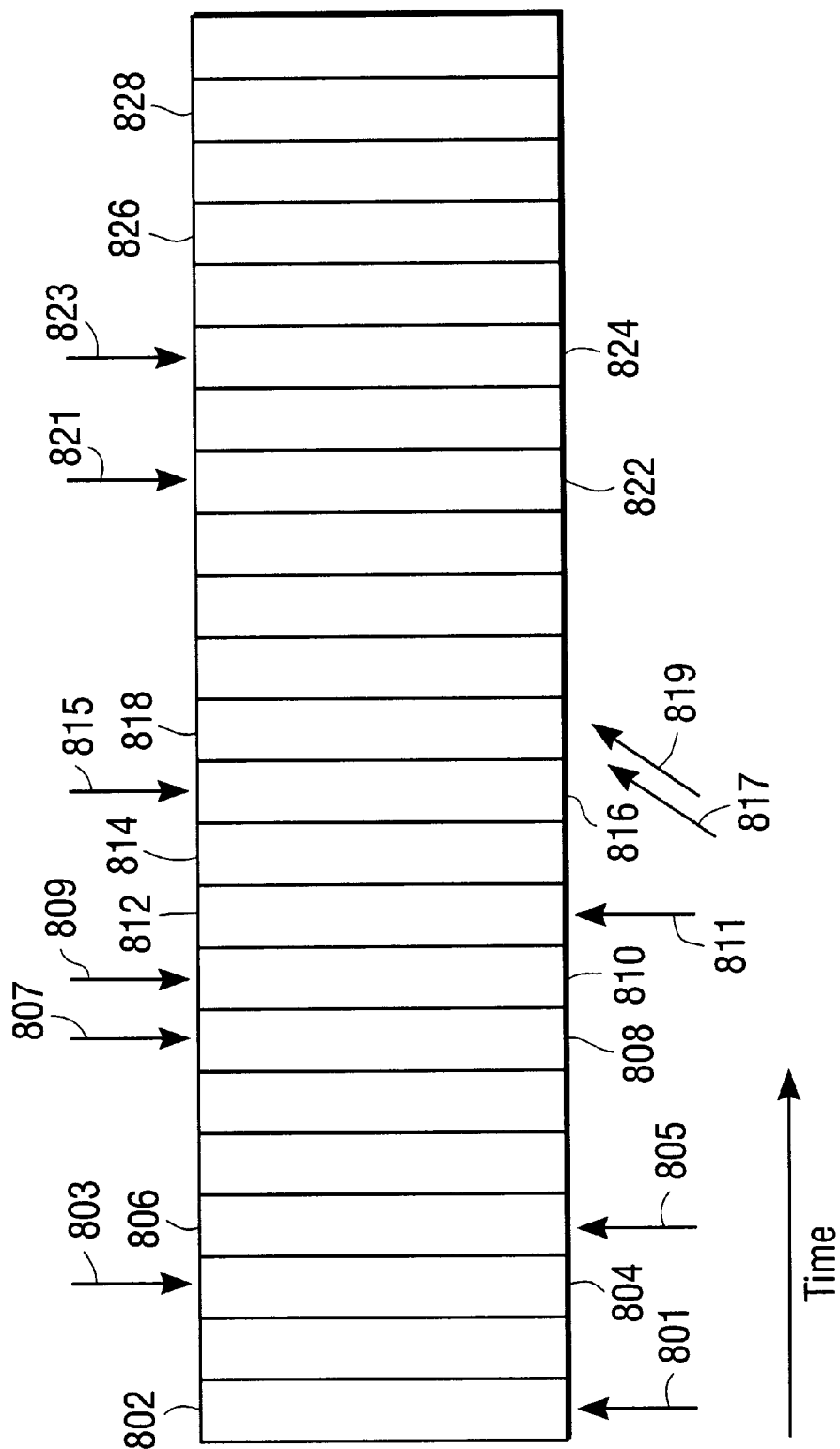
FIG. 8 is an illustrative connection request scenario in a prior art server system.

FIG. 8 illustrates a typical traffic scenario depicting the disadvantage experienced by subscriber-originated connection requests during heavy traffic loading conditions in a prior art server system. At time slot 802, a subscriber-originated call 801 for a circuit switched service becomes pending at a first subscriber. At time slot 804, the server system transmits a poll message 803. At time slot 806, the first subscriber transmits a resource request message 805 in response to poll message 803 to the server system for its respective pending call 801. However, at this time, the server system has no connection resources to allocate for pending call 801. Thus, the server system does not respond to resource request message 805. The lack of response causes the first subscriber to take action as though it has been in a collision. Thus, the first subscriber backs off until time slot 814; i.e., until time slot 814, the first subscriber does not listen for, nor respond to, a poll message transmission.

At time slot 808, the server system transmits poll message 807. However, because there are no subscribers listening for a poll message at time slot 808, no resource request message is subsequently transmitted to the server system in response.

At time slot 810, the server system receives a network-originated circuit switched connection request 809. Because the server system has connection resources to allocate at time slot 810, network-originated connection request 809 is serviced, i.e., allocated one or more time slots, and becomes a connection in progress.

At time slot 812 a subscriber-originated call 811 for a packet data service becomes pending at a second subscriber. As previously noted, at time slot 814, the first subscriber begins looking anew for a poll message transmission from a server system, for its still pending call 801. At time slot 816 the server system transmits a poll message 815. The first and second subscribers both respond to poll message 815 with respective resource request messages 817 and 819 transmitted in the same time slot 818. Thus, in time slot 818 a true collision occurs.

Because of the collision of resource request messages 817 and 819 in time slot 818, the server system does not respond to either, and both the first and second subscribers subsequently deem that a collision has occurred and execute respective back off procedures. The first subscriber backs off until time slot 826 before it will begin again to listen for a poll message. The second subscriber backs off until time slot 828.

In the meantime, the server system receives a network-originated connection request 821 for a circuit switched service in time slot 822. As the server system has adequate connection resources to allocate to the network-originated connection request 821 at time slot 822, the network-originated connection request 821 is allocated one or more time slots and becomes a connection in progress.

In time slot 824 the server system receives a network-originated connection request 823 for a packet data service. As the server system has adequate connection resources to allocate to the network-originated connection request 823 at time slot 824, the connection request 823 is allocated one or more time slots and becomes a connection in progress.

Thus, the traffic sequence scenario in FIG. 8 depicts that network-originated connection requests are generally favored over subscriber-originated connection requests in the prior art server systems. If the first and second subscribers had not each been required to execute back off procedures, one or both of them would likely have been allocated appropriate available time slot(s), and become connections in progress. Yet, because both the first and second subscriber were required to execute back off procedures, the network-originated calls 809, 821 and 823 were subsequently favored, i.e., allocated time slots over the allocation of time slots for the pending subscriber-originated calls 801 and 811.

The inequitable access mechanism described above, and in particular with reference to FIG. 8, arises because the prior art server systems require subscribers to perform a classic back off procedure and re-attempt access at some later time, even if no collision has occurred. In the prior art, if a server system has an inadequate number of time slots available to service a respective subscriber-originated connection request upon receipt, the subscriber generally acts as though it was involved in a collision. This process automatically favors network-originated traffic as network-originated connection requests are simply queued if there are no time slots available to allocate to them when they are received by a server system. Network-originated connection requests are not required to execute a back off procedure nor an access re-attempt if they cannot be serviced when they first arrive at a server system. Being queued, network-originated connection requests are thereafter generally allocated appropriate time slot(s), when, and if, they become available.

Ordinarily, in a circuit switched only, i.e., single, primary service, network, the prior art approach is generally sufficient because circuit switched call arrival rates are usually lower than subscriber back off time periods. However, in a network that supports packet data, the packet data call arrival rates are generally commensurate with the subscriber back off time periods under conditions of medium to heavy traffic loading at a respective server system. As a consequence, there is a significantly increased probability that a subscriber, after executing a back off procedure from a presumed previous collision, will subsequently collide with a new subscriber with a packet data call pending.

The process can potentially continue for several iterations of back off and server system access re-attempts, until the subscriber is either granted access to the server system, i.e., allocated one or more time slots for its pending call, or until it aborts the call transmission attempt, deeming the call blocked. This increase in access latency immediately favors network-originated traffic if it is simply queued, pending the connection request being granted time slot(s) when available. This situation, however, is undesirable as a goal of a network is to provide equity of access between network and subscriber-originated connection requests during all periods of traffic loading, including heavy traffic loading conditions.

Thus, in a presently preferred embodiment, subscriber-originated call deferred queuing requires that a server system, i.e., base station 102 of FIG. 1, ensure that sufficient time slots are generally allocated for random access signalling. Further, in a presently preferred embodiment, subscriber-originated connection requests are queued at the receiving base station 102 if the respective resource request message is correctly received but the base station 102 does not have adequate connection resources, i.e., time slots, to allocate to it at the time of its receipt. In addition, in a presently preferred embodiment, an acknowledgment and page functionality is implemented for subscriber-originated connection requests.

Sufficient time slots dedicated to random access signalling helps ensure that subscriber-originated traffic can at least place a connection request with a respective base station 102, i.e., transmit a resource request message that is correctly received by a respective base station 102, with a relatively small chance of a collision. Thus, at generally low to moderate traffic arrival rates, equitable access between subscriber and network-originated traffic can be provided by ensuring that the rate of poll message transmissions is greater than the arrival rate of subscriber-originated traffic.

However, as the traffic load on a network, and on a base station 102 in particular, increases, this approach in itself is inadequate. This is because base station time slots for random access signalling, i.e., poll/resource request message exchanges, cannot be indefinitely increased faster than the base station traffic arrival rate, especially if multiple time slots for potential resource request messages are allocated for each issued poll message. If base station time slots for random access signalling were indefinitely increased, to the maximum number of time slots available, eventually all the time slots would be consumed by random access signalling, with none remaining to service circuit switched or packet data traffic, whether network or subscriber-originated.

Additionally, increasing the number of time slots allocated for random access signalling purely in response to traffic loading at a respective base station 102 is likely to lead to a high rate of full power poll messages transmitted from the base station 102. The high rate of transmitted full power poll messages can cause an undesirable increase in co-channel interference at the base station 102, which, in turn, can lead to a reduction in system quality and capacity.

Thus, in a presently preferred embodiment, in addition to generally ensuring adequate time slots for random access signalling, subscriber-originated connection requests may be queued at a respective base station 102 and an acknowledgment and page functionality implemented for successful processing of the queued subscriber-originated connection requests.

In a presently preferred embodiment, upon successfully receiving a resource request message from a subscriber, e.g., the resource request message is not involved in a collision with another resource request message, if the base station 102 does not have adequate connection resources available to service it at the time of its receipt, the base station 102 queues the respective connection request. More particularly, if the respective connection request is for a circuit switched service, the base station 102 queues it to a subscriber primary service queue. Alternatively, if the respective connection request is for a packet data service, the base station 102 queues it to a subscriber secondary service queue.

In a presently preferred embodiment, the base station network primary service queue and subscriber primary service queue are subsequently serviced by the base station 102 when time slots become available, on an equality of access basis. Additionally, in a presently preferred embodiment, the base station network secondary service queue and subscriber secondary service queue are subsequently serviced, after the respective primary service queues are serviced, and when time slots become available, on an equality of access basis.

In a more presently preferred embodiment, subscriber-originated resource request messages and network-originated connection requests each contain a call priority code or value. The respective call priority code or value allows a respective base station's subscriber and network queues to be serviced in a prioritized manner.

In a presently preferred embodiment, subscriber-originated call deferred queuing additionally involves an acknowledgment and page functionality. The acknowledgment functionality permits a base station 102 to acknowledge a subscriber-originated connection request even if the base station 102 has an inadequate number of time slots to allocate to it at the time of its receipt. It involves the base station 102 transmitting an acknowledge message to the respective subscriber, informing the subscriber that a back off procedure is not required, because no collision has occurred. The acknowledge message further informs the respective subscriber that its connection request has not yet been serviced, and that the subscriber should look for the base station 102 to page it, thereby informing it that its connection request has been serviced.

The page functionality requires the respective subscriber, rather than executing a back off procedure and attempting re-access to a base station 102 thereafter, to monitor, or poll, for a resource acknowledge message addressed to it from the base station 102. The base station 102 transmits a resource acknowledge message to the respective subscriber when, and if, the base station 102 has the requisite time slots available to allocate to the subscriber's queued connection request.

In a presently preferred embodiment, a subscriber-originated connection request, for either a circuit switched or a packet data service, has a base station lifetime value associated with it. The base station lifetime value of a respective subscriber-originated connection request is the maximum amount of time that a base station 102 is to maintain the connection request in a respective queue, waiting to allocate it appropriate available time slot(s). If the base station lifetime of a subscriber-originated pending connection request expires before the receiving base station 102 has allocated it one or more time slots, and, thus, rendered it a connection in progress, the base station 102 drops it, deleting it from its respective subscriber primary service queue or subscriber secondary service queue.

In a presently preferred embodiment, a subscriber-originated connection request, for either a circuit switched or a packet data service, has a subscriber lifetime value associated with it. A respective subscriber lifetime value is the maximum amount of time that a subscriber is to wait for a base station 102 to page it, indicating that the base station 102 has serviced its pending connection request. More particularly, the subscriber lifetime value is the maximum amount of time that a subscriber will poll for a resource acknowledge message from the base station 102, upon receipt of an acknowledge message from the base station 102.

In a presently preferred embodiment, if the subscriber lifetime value for a respective connection request expires, the subscriber assumes that the corresponding call cannot be serviced by a base station 102 at that time, and, generally, executes a back off procedure. Thereafter, the subscriber will attempt to engage in another random access signalling protocol sequence with a base station 102, for its current pending call. If, however, as previously discussed, the subscriber's number of resource request message transmissions for the respective pending call exceeds a specific, configurable, number of attempts, the subscriber considers the respective pending call blocked, and drops it.

In an alternative embodiment, if the subscriber lifetime value for a respective connection request expires, the subscriber assumes that the corresponding call is blocked, and drops it.

A base station 102 and a subscriber use respective lifetime counters, or timers, to coordinate their respective lifetime values associated with a subscriber-originated connection request. In a presently preferred embodiment, a subscriber provisions a respective base station 102 with a base station lifetime value for the connection request in the respective resource request message. In a presently preferred embodiment, to ensure that a base station's time slots are not wasted, the base station lifetime counter for the respective subscriber-originated connection request is set to expire prior to the respective subscriber's corresponding subscriber lifetime counter.

In a presently preferred embodiment, a network-originated connection request, for either a circuit switched or a packet data service, has a network lifetime value associated with it. The network lifetime value of a respective network-originated connection request is the maximum amount of time that a base station 102 is to queue the connection request, waiting to allocate it time slots for communications service. If the network lifetime of a network-originated connection request expires before the receiving base station 102 has allocated it one or more time slots, and, thus, rendered it a connection in progress, the base station 102 drops it, deleting it from its respective network primary service queue or network secondary service queue.

Figure 9:
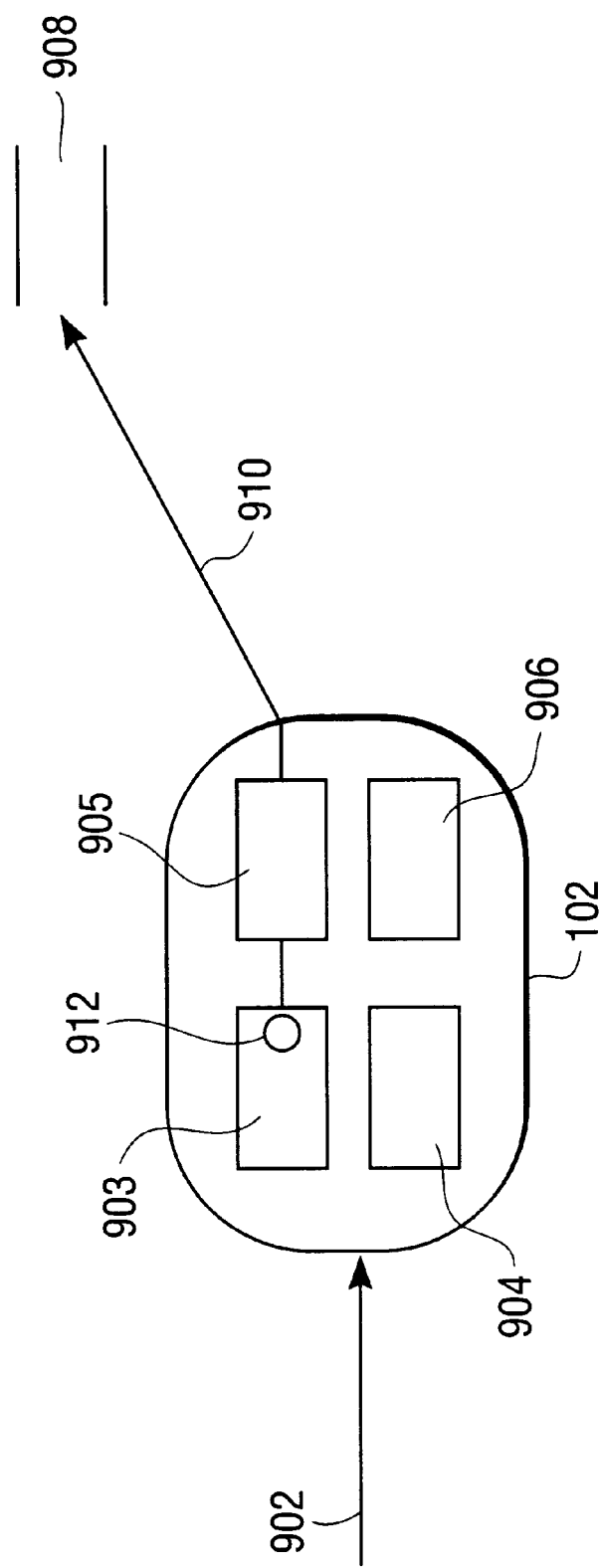
FIG. 9 illustrates the handling of an exemplary subscriber-originated connection request at a presently preferred embodiment base station.

Referring to FIG. 9, a typical subscriber-originated connection request 902 arrives at a presently preferred embodiment server system, i.e., base station 102. Subscriber-originated connection request 902 is a request from a subscriber for a connection link, i.e., time slot allocation, on the base station 102, for use in subsequent communications.

The base station 102 has four queues for storing pending connection requests: subscriber-originated primary service queue 903, subscriber-originated secondary service queue 904, network-originated primary service queue 905 and network-originated secondary service queue 906. The base station 102 stores pending connection requests in a respective queue, based on the source (i.e., subscriber or network) and service-type (i.e., primary or secondary) of the connection request.

In a presently preferred embodiment, upon receiving the subscriber-originated connection request 902, the base station 102 checks if it has available connection resources to service it. If not, the base station 102 queues the connection request 902 to either the subscriber primary service queue 903 or the subscriber secondary service queue 904, determined by whether the subscriber-originated connection request 902 is for a circuit switched or a packet data service respectively.

If there are available connection resources to allocate to the subscriber-originated connection request 902, the base station 102 also checks if there are any queued connection requests (i.e., pending connection requests) in its various service queues 903, 904, 905 and 906. More particularly, if the connection request 902 is for the primary service, the base station 102 checks if there are any pending connection requests in the subscriber-originated primary service queue 903 or the network-originated primary service queue 905. If not, the base station 102 allocates an appropriate number of available time slots 908 to the connection request 902, which thereafter is designated a connection in progress 910. If, however, the connection request 902 is for the primary service and there are pending connection requests in the subscriber-originated primary service queue 903 or the network-originated primary service queue 905, the base station 102 queues the received connection request 902 to the subscriber-originated primary service queue 903.

If the connection request 902 is for the secondary service, and there are available connection resources to allocate to it upon receipt, the base station 102 checks if there are any pending connection requests in any of its service queues 903, 904, 905 and 906. If not, the base station 102 allocates an appropriate number of available time slots 908 to the connection request 902, which then becomes a connection in progress 910. If, however, the connection request 902 is for the secondary service and there are pending connection requests in the subscriber-originated primary service queue 903, network-originated primary service queue 905, subscriber-originated secondary service queue 904 or network-originated secondary service queue 906, the base station 102 queues the received connection request 902 to the subscriber-originated secondary service queue 904.

The base station 102 interrogates queues 903, 904, 905 and 906 periodically, or in an alternative embodiment, based on some predefined event (or events), to determine if any have pending connection requests in them. For exemplary purposes, assume connection request 902 is for a circuit switched service, and has been queued in the base station's subscriber primary service queue 903; thus, it is a pending connection request 912. The base station 102, if it has an appropriate number of available time slots 908 to allocate to the pending connection request 912 when it interrogates service queue 903, removes the pending connection request 912 from the service queue 903 and allocates the necessary time slot(s) to it. At this time, the pending connection request 912 becomes a connection in progress 910.

In a presently preferred embodiment, network-originated connection requests are treated in a generally like manner as disclosed above with regards to subscriber-originated connection requests.

In an alternative embodiment, the base station 102 queues every subscriber-originated connection request and every network-originated connection request upon receipt. In this alternative embodiment, the base station 102 interrogates the queues on some predefined schedule, servicing the pending connection requests in an ordered fashion.

Figure 10:
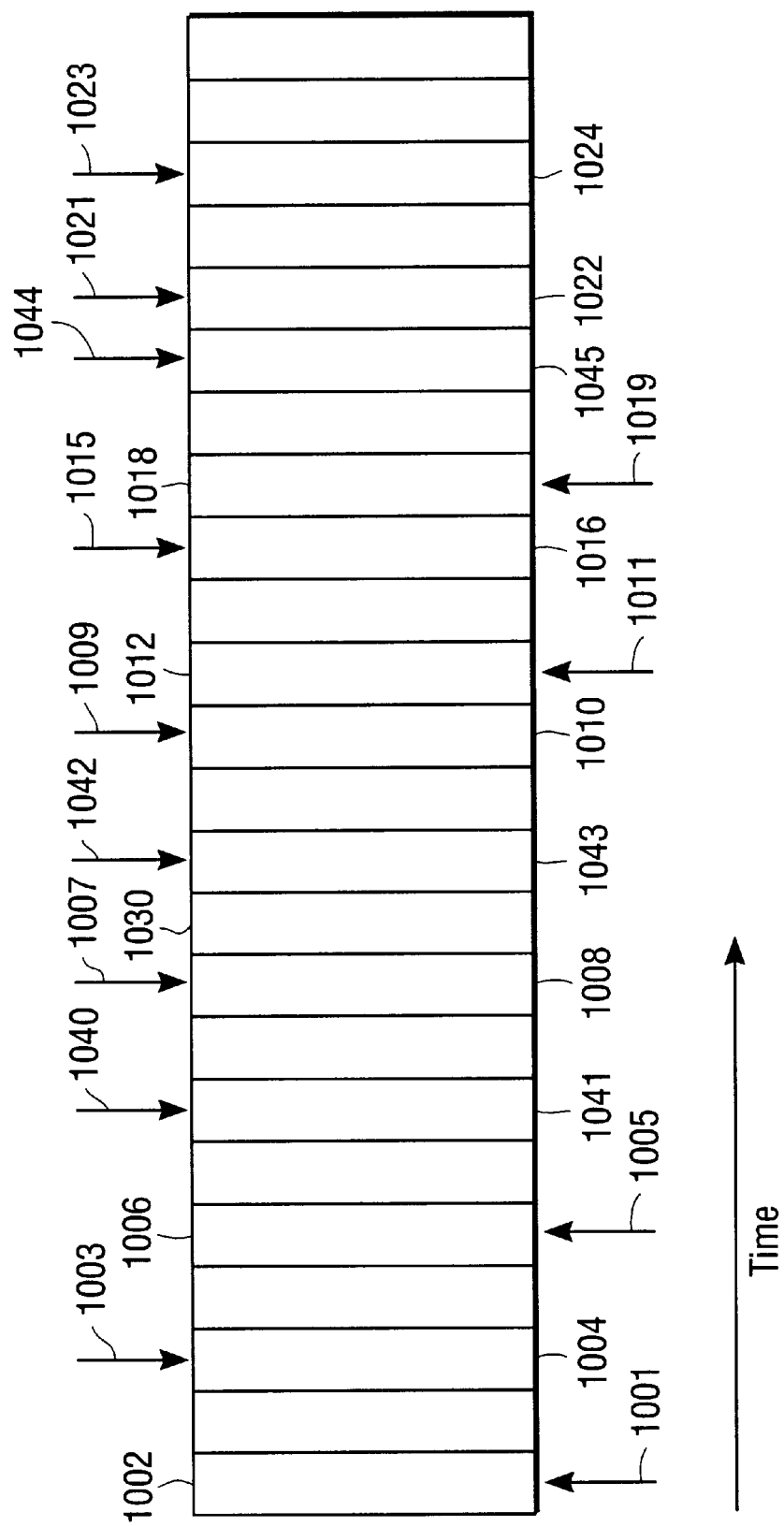
FIG. 10 is an illustrative connection request scenario in a presently preferred embodiment base station.

Referring to FIG. 10, in a presently preferred embodiment server system, subscriber and network-originated connection requests enjoy equal access to the server system, even under generally heavy traffic loading conditions. FIG. 10 depicts the basic initial traffic sequence scenario first illustrated in FIG. 8. However, in FIG. 10, a presently preferred embodiment server system, i.e., base station 102 of FIG. 1, is employed.

At time slot 1002 a subscriber-originated call 1001 for a circuit switched service becomes pending at a first subscriber. At time slot 1004 a base station transmits a poll message 1003. At time slot 1006, the first subscriber transmits a resource request message 1005 in response to poll message 1003 to the base station for its respective pending call 1001.

As in FIG. 8 for pending subscriber-originated call 801, in FIG. 10 there are no available connection resources to allocate to pending subscriber-originated call 1001. However, in FIG. 10, the base station queues the connection request of resource request message 1005 in a subscriber primary service queue and transmits an acknowledge message 1040 in time slot 1041 to the first subscriber. As the first subscriber receives the acknowledge message 1040, it does not execute a back off procedure. Instead, it begins to poll the subsequent time slots for a resource acknowledge message for it, indicating the base station has allocated connection resources to its pending connection request.

At time slot 1008, the base station transmits poll message 1007. However, because there are no subscribers listening for a poll message at time slot 1008, no resource request message is subsequently transmitted to the base station in response.

At time slot 1030, the base station has available resources to allocate to a connection request. The base station, interrogating its various queues, determines that it has a pending connection request for the subscriber-originated call 1001. The base station allocates one or more time slots to this pending connection request, and deletes the pending connection request from the subscriber primary service queue. The base station also transmits a resource acknowledge message 1042 in time slot 1043 to the first subscriber, informing the first subscriber that connection resources have been allocated for its pending call 1001 and identifying the respective allocated connection resources.

At time slot 1010, the base station receives a network-originated circuit switched connection request 1009. Because the base station has an appropriate number of connection resources to allocate to connection request 1009 at time slot 1010, network-originated connection request 1009 is serviced, i.e., allocated one or more time slots, and becomes a connection in progress.

At time slot 1012 a subscriber-originated call 1011 for a packet data service becomes pending at a second subscriber. At time slot 1016 the base station transmits a poll message 1015. The second subscriber responds to poll message 1015 with a respective resource request message 1019 transmitted in time slot 1018. The base station correctly receives resource request message 1019, and because it has adequate time slots available, it allocates one or more time slots to the respective connection request, rendering it a connection in progress. The base station transmits a resource acknowledge message 1044 in time slot 1045 to the second subscriber, informing the second subscriber that connection resources have been allocated for its pending call 1011 and identifying the respective allocated connection resources.

The base station subsequently receives a network-originated connection request 1021 for a circuit switched service in time slot 1022. As the base station has adequate connection resources to allocate to the network-originated connection request 1021 at time slot 1022, the connection request 1021 is allocated one or more time slots and becomes a connection in progress.

In time slot 1024, the base station receives a network-originated connection request 1023 for a packet data service. At time slot 1024, however, the base station does not have adequate connection resources to allocate to connection request 1023. Thus, the base station queues connection request 1023 to its network secondary service queue.

The traffic sequence scenario of FIG. 10, in contrast to the traffic sequence scenario of FIG. 8, which embodied a prior art server system, demonstrates that in a presently preferred embodiment server system, subscriber-originated traffic enjoys equality of access with network-originated traffic to the server system's connection resources.

The presently preferred subscriber-originated call deferred queuing method and the resultant hardware and software that implements it are attractive as subscribers are no longer required to back off following a successful resource request message transmission but lack of assignable time slots, i.e., connection resources, at a server system. Furthermore, equality of access between network and subscriber-originated traffic to a server system's connection resources is achieved. Additionally, successfully received resource request messages are no longer required to be retransmitted, which reduces the random access signalling load on a respective server system. Also, the poll message transmission rate on a server system can be maintained at a rate that is fundamentally commensurate with the traffic arrival rate at the server system. This is important as it allows the co-channel interference concerns of the generally high power poll messages to be mitigated and/or controlled.

In a presently preferred embodiment, each server system, i.e., base station 102 of FIG. 1, has a processor and associated memory for executing respective instructions to accomplish the above-described methods and procedures.

While preferred embodiments are disclosed herein, many variations are possible which remain within the spirit and scope of the invention. Such variations would become clear to one of ordinary skill in the art after inspection of the specification, drawings and claims herein. The invention therefore is not to be restricted except by the scope of the appended claims.

What is claimed is as follows:

1. A method for providing subscriber-originated access on a server system, comprising:
    selectively transmitting from the server system a first message indicating that a subscriber may transmit a subscriber-originated connection request to the server system;
    receiving a subscriber-originated connection request from a respective subscriber for access on the server system;
    queuing the subscriber-originated connection request on the server system;
    transmitting a second message from the server system to the respective subscriber upon queuing the subscriber-originated connection request;
    allocating a connection resource to the queued subscriber-originated connection request; and
    transmitting a third message from the server system to the respective subscriber upon allocating a connection resource to the queued subscriber-originated connection request.

2. The method of claim 1, in which the server system comprises a plurality of connection resources, and in which queuing the subscriber-originated connection request is performed if the server system has no connection resources to allocate upon receiving a subscriber-originated connection request.

3. The method of claim 1, in which the server system is a dual service server system, and in which queuing the subscriber-originated connection request comprises queuing the subscriber-originated connection request to a subscriber primary service queue or a subscriber secondary service queue.

4. The method of claim 3 in which the subscriber primary service queue is for queuing subscriber-originated circuit switched service connection request and the subscriber secondary service queue is for queuing subscriber-originated packet data service connection requests.

5. The method of claim 1, in which the server system uses time division multiple access for transmitting and receiving communications to and from a plurality of subscribers, and wherein the first message is transmitted in each time frame.

6. The method of claim 1, in which the server system comprises a plurality of connection resources, and in which queuing the subscriber-originated connection request is performed if the server system has less connection resources to allocate than the number of connection resources required to service the connection of the subscriber-originated connection request.

7. The method of claim 1, further comprising:
queuing a plurality of subscriber-originated connection requests on the server system;
receiving a network-originated connection request for access on the server system;
queuing the network-originated connection request on the server system; and
allocating a connection resource to the queued network-originated connection request.

8. The method of claim 5, in which the second message is an acknowledge message, the third message is a resource acknowledge message, and each first message is a poll message.

9. The method of claim 1, in which queuing the subscriber-originated connection request comprises queuing the subscriber-originated connection request for no longer than a server lifetime time limit.

10. The method of claim 1, in which the server system comprises a subscriber primary service queue, a subscriber secondary service queue, a network primary service queue and a network secondary service queue, further comprising interrogating the subscriber primary service queue for subscriber-originated connection requests for a primary service, interrogating the subscriber secondary service queue for subscriber-originated connection requests for a secondary service, interrogating the network primary service queue for network-originated connection requests for the primary service, and interrogating the network secondary service queue for network-originated connection requests for the secondary service.

11. The method of claim 10, in which interrogating the subscriber secondary service queue and interrogating the network secondary service queue are each performed after both interrogating the subscriber primary service queue and interrogating the network primary service queue are performed, and if there are no connection requests queued in the subscriber primary service queue or the network primary service queue.

12. The method of claim 1, in which the selective transmission of a first message from the server system is based on the traffic conditions on the server system.

13. A method for supporting subscriber-originated access to a server system, comprising:
selectively receiving a first message indicating that a subscriber may transmit a subscriber-originated connection request to the server system;
transmitting a subscriber-originated connection request to a server system;
receiving a second message from the server system indicating that the subscriber-originated connection request was received and queued by the server system;
polling for a third message from the server system that indicates that a connection resource has been allocated for the subscriber-originated connection request;
receiving a third message from the server system indicating that a connection resource has been allocated for the subscriber-originated connection request; and
transmitting a subscriber-originated message to the server system using the connection resource allocated for the subscriber-originated connection request.

14. The method of claim 13 in which the subscriber-originated connection request comprises a server lifetime value.

15. The method of claim 14, in which the subscriber-originated connection request has an associated subscriber lifetime value that is greater than the server lifetime value.

16. The method of claim 15, in which polling for a third message from the server system is performed until a third message is received from the server system or until a time period equal to the associated subscriber lifetime value elapses.

17. The method of claim 13, in which the subscriber-originated connection request comprises a subscriber-originated circuit switched service connection request or a subscriber-originated packet data service connection request.

18. The method of claim 13, in which the first message is a poll message from the server system.

19. The method of claim 13, in which the second message is an acknowledge message and the third message is a resource acknowledge message.

20. The method of claim 13, in which a time division multiple access scheme is used for transmitting and receiving communications to and from the server system.

* * * * *

Disclaimer 6,078,959—Andrew S. Wright, Vancouver, Canada; Carl Mansfield, Colorado Springs, Colo.; Izzet Murat Bilgic, Colorado Springs, Colo.; Benjamin Kendrick Gibbs, Colorado Springs, Colo. SUBSCRIBER-ORIGINATED CALL DEFFERRED QUEUING. Patent dated June 20, 2000. Disclaimer filed May 2, 2002 by the assignee, Opuswave Networks, Inc.

Hereby disclaims and dedicates to the Public all claims and entire term of said patent.
*(Official Gazette, August 20, 2002)*